(12) United States Patent
Petit

(10) Patent No.: US 10,670,184 B2
(45) Date of Patent: Jun. 2, 2020

(54) GREASE TOOL FOR REPACKING DUAL ANGULAR CONTACT BEARING WITH GREASE, AND METHOD OF USING SAME

(71) Applicant: Denis Petit, Merrimack, NH (US)

(72) Inventor: Denis Petit, Merrimack, NH (US)

( * ) Notice: Subject to any disclaimer, the term of this patent is extended or adjusted under 35 U.S.C. 154(b) by 253 days.

(21) Appl. No.: 15/616,307

(22) Filed: Jun. 7, 2017

(65) Prior Publication Data

US 2017/0370412 A1 Dec. 28, 2017

Related U.S. Application Data

(60) Provisional application No. 62/355,636, filed on Jun. 28, 2016.

(51) Int. Cl.
*F16N 37/00* (2006.01)
*F16C 33/66* (2006.01)
*F16N 21/02* (2006.01)
*F16C 19/18* (2006.01)

(52) U.S. Cl.
CPC ........ *F16N 37/003* (2013.01); *F16C 33/6603* (2013.01); *F16C 33/6622* (2013.01); *F16N 21/02* (2013.01); *F16C 19/184* (2013.01); *F16C 2326/02* (2013.01)

(58) Field of Classification Search
CPC .. F16C 41/00; F16C 2237/00; F16C 33/6603; F16C 43/04
See application file for complete search history.

(56) References Cited

U.S. PATENT DOCUMENTS

| 1,865,932 | A | * | 7/1932 | Macindoe | F16N 21/04 137/614.05 |
| 2,438,128 | A | * | 3/1948 | Poyner | F16N 21/02 184/5.1 |
| 2,839,160 | A | * | 6/1958 | Wright | F16C 43/04 184/5.1 |
| 2,911,068 | A | * | 11/1959 | Wright | F16N 37/003 184/5.1 |

(Continued)

OTHER PUBLICATIONS http://www.twoguyshobby.com/seperate-greasers/greaser, at least as early as Jun. 15, 2016.

(Continued)

*Primary Examiner* — Michael R Mansen
*Assistant Examiner* — Mark K Buse
(74) *Attorney, Agent, or Firm* — Davis & Bujold PLLC; Michael J. Bujold

(57) ABSTRACT

A grease tool and method for greasing a dual angular contact bearing where the grease tool is fabricated from a single unitary piece of material. The grease tool comprises a cylindrical hub, a flange supported adjacent only one end of the cylindrical hub, and a grease fitting attached to the grease tool to facilitate a supply of grease thereto. During use, a pair of spaced apart O-rings, accommodated by an exterior surface of the cylindrical hub, form a pair of grease seals with an inwardly facing surface of an inner race of the dual angular contact bearing. A supply passage conveys the supplied grease from the grease fitting to a grease outlet(s) located in an exterior cylindrical surface of the grease tool, between the pair of O-rings, for conveyance of the supplied grease radially to the inner race of the dual angular contact bearing and facilitate repacking thereof.

22 Claims, 9 Drawing Sheets

(56) References Cited

U.S. PATENT DOCUMENTS

| | | | | |
|---|---|---|---|---|
| 3,048,236 A * | 8/1962 | Larke | ................... | F16N 37/003 184/5.1 |
| 3,365,024 A * | 1/1968 | Freda | ................... | F16N 37/003 184/5.1 |
| 3,724,596 A * | 4/1973 | Freda | ................... | F16N 37/003 184/5.1 |
| 4,058,185 A * | 11/1977 | Ploeger | ................... | B60B 7/002 184/5.1 |
| 4,113,059 A * | 9/1978 | Markovski | ............... | F16N 3/12 184/105.1 |
| 4,293,056 A * | 10/1981 | Setree, II | ............... | B60B 35/02 184/105.3 |
| 4,928,794 A * | 5/1990 | Bangerger | .......... | F16C 33/6622 184/5.1 |
| 5,303,800 A * | 4/1994 | Persson | ................ | B60B 27/001 184/45.1 |
| 6,079,519 A * | 6/2000 | Lottes | ................... | F16N 21/02 137/226 |
| 7,467,690 B2 * | 12/2008 | Liao | ................... | F16C 33/6625 184/5.1 |
| 8,042,654 B2 * | 10/2011 | Park | ..................... | F16C 33/102 16/2.1 |
| 8,205,639 B2 * | 6/2012 | Kim | ......................... | F16K 1/12 137/512 |
| 8,931,595 B2 * | 1/2015 | Koma | .................... | F16N 11/02 184/5.1 |
| D869,531 S * | 12/2019 | Ascher | ........................ | D15/150 |
| 2008/0230319 A1 * | 9/2008 | Park | ..................... | F16C 33/102 184/105.3 |
| 2012/0061185 A1 * | 3/2012 | Brehmer | ................... | F16N 7/34 184/14 |

OTHER PUBLICATIONS https://web.archive.org/web/20111126184421/http://www.cycleworks.net. . . , Wheel Bearing Greaser—1955 to 1969—$24.00: CycleWorks.net, 1-2 pages.

https://www.theextensiondepot.com/collections/youth-snowmobile-parts/products/arctic-cat-30mm-greaser-service-tool, Arctic Cat 30MM Greaser Service Tool, Extension Deport LLC, Apr. 18, 2017??.

* cited by examiner

GREASE TOOL FOR REPACKING DUAL ANGULAR CONTACT BEARING WITH GREASE, AND METHOD OF USING SAME

CROSS REFERENCE TO RELATED APPLICATIONS AND PRIORITY CLAIM

This application claims the benefit of U.S. Provisional Patent Application No. 62,355,636, filed on Jun. 28, 2016, which is herein incorporated by reference in its entirety.

FIELD OF THE INVENTION

The present invention relates to a grease tool which facilitates supplying grease to an inner race of a wheel bearing, such as a dual angular contact bearing, in order to replenish the supply of grease which is typically required for sufficient lubrication of the ball bearings contained therein.

BACKGROUND OF THE INVENTION

A conventional grease tool allows grease to be inserted and displace any air pockets or other contaminants located within a bearing chamber defined by the bearing, thereby greatly reducing the possibility of outside contaminants entering the bearing and causing premature failure of the bearing. Prior art methods and techniques typically utilize a tool that requires access to both sides of the wheel bearing thereby requiring, precisely machined mechanical assemblies to be mated together with one another from opposite sides. Moreover, they are generally not easy to insert, typically result in direct metal to metal contact, and rely on a body, a cap or a cover, and a threaded device to fasten the grease tool components to the bearing which runs the risk of scratching the bearing surface and possibly rendering the bearing unusable. In some instances, the two sides which are assembled together get stuck to the bearing and, thereafter, require forcible removal of the grease tool which can lead to damage to the bearing or possibly the housing.

SUMMARY OF THE INVENTION

Wherefore, it is an object of the present invention to overcome the above mentioned shortcomings and drawbacks associated with the prior art tools for greasing a bearing.

The presented invention relates to a tool that allows a simple three step process in order to add grease to a conventional wheel bearing. The first step involves—once access to the wheel bearing is achieved—popping or inserting the grease tool into the inner race of the wheel bearing. The second step involves connecting a conventional grease dispenser to the nipple of the grease tool and pumping a supply of grease into the grease tool. The third step, once a sufficient supply of grease is added to the wheel bearing, involves popping or removing the grease tool from the inner race of the wheel bearing and then reassembling the components coupled to the wheel bearing.

The grease tool is generally a single sided tool since there normally is not any need to have access to both opposed sides of a wheel bearing. The grease tool, according to the invention, generally avoids metal to metal contact, is self-centering with self pressurizing O-rings which seal and protect, and typically has at least one radially delivery port, e.g., generally 2 to 20 radially delivery ports, which evenly distribute the supplied grease about the periphery of the grease tool. It is to be appreciated that the total number of radially delivery ports can vary from application to application. The most important aspect is that the supplied grease is conveyed to the exterior surface of the grease tool for radially distribution about the entire circumference of the wheel bearing.

The grease tool may be equipped with one or more pry points or a some other gripping feature which facilitates easy removal of the grease tool, following the supply of grease to a wheel bearing, in the event that access to a rear side of the wheel bearing is not easy or readily accessible.

Another object of the present invention is to provide a grease tool which is relatively inexpensive to manufacture and is relatively easy to use and remove from the wheel bearing.

A further object of the present invention is to provide a grease tool which generally self-centers itself, within the inner race of the wheel bearing to be greased, so as to expedite installation of the grease tool within the wheel bearing to be greased and facilitate the supplying grease to a wheel bearing.

Still another object of the present invention is to provide a grease tool which facilitates purging or displacing of air pockets, voids, dirt, debris, and other contaminants from the bearing chamber of the wheel bearing and thereby facilitates repacking of the wheel bearing with a fresh supply of grease.

Yet another object of the present invention is to minimize the size of the space defined between the exterior cylindrical surface of the grease tool, the pair of O-rings and the inwardly facing surface of the inner race so as to minimize the amount of grease required to be supplied to the wheel bearing to adequately grease the same and thereby avoid wasting grease.

A further object of the invention is to provide a sufficient seal clearance between the exterior outwardly facing surface of the grease tool and the radially inwardly facing surface of the inner race to facilitate easy insertion and withdrawal of the grease tool relative to the radially inwardly facing surface of the inner race.

A still further object of the present invention is to provide the grease tool with a built in shoulder or stop which abuts against a lateral surface of the inner race and automatically and properly radially aligns the one or more delivery port(s) with the gap provided between the inner races of the wheel bearing to facilitate supplying grease thereto.

Yet another object of the invention is to provide a grease tool which permits servicing of wheel bearings which have a wide range of axial width.

Another object of the invention is to provide a grease tool which can readily be disassembled in order to facilitate cleaning thereof.

A further object of the invention is to provide a grease tool which avoids forcing the pair of inner races toward one another and thereby facilitates the supply of grease to the bearing chamber without compromising the external seals of the wheel bearing.

The present invention also relates to a grease tool for mating with at least one inner race of a dual angular contact bearing and facilitate greasing of the dual angular contact bearing, and the grease tool being fabricated from a single unitary piece of material and comprising: a cylindrical hub having an exterior cylindrical surface; a flange being supported adjacent one end of the cylindrical hub for limiting insertion of the grease tool into the at least one inner race of the dual angular contact bearing; a grease fitting being attached to the grease tool to facilitate supplying grease thereto; the grease fitting being coupled to a supply passage for conveying supplied grease to at least one grease outlet formed in the exterior cylindrical surface; a pair of spaced apart O-rings being accommodated by an exterior surface of the cylindrical hub and the at least one grease outlet being located in the exterior surface of the cylindrical hub between the pair of O-rings; and the pair of spaced apart O-rings facilitate forming a pair of spaced apart grease seals, when the grease tool engages with an inwardly facing surface of the at least one inner race of the dual angular contact, and directing of the supplied grease radially into a bearing chamber of the dual angular contact bearing to facilitate repacking the bearing chamber with grease.

The present invention also relates to a method of greasing a bearing chamber of a dual angular contact bearing with a grease tool fabricated from a single unitary piece of material, the method comprising: providing a cylindrical hub having an exterior cylindrical surface; supporting a flange adjacent one end of the cylindrical hub for preventing further insertion of the grease tool into the at least one inner race of the dual angular contact bearing; attaching a grease fitting to a trailing surface of the grease tool to facilitate supplying grease thereto; connecting the grease fitting to a supply passage for conveying supplied grease to at least one grease outlet formed in the exterior cylindrical surface; accommodating a pair of spaced apart O-rings on the exterior surface of the cylindrical hub, and locating the at least one grease outlet in the exterior surface of the cylindrical hub between the pair of O-rings; inserting the grease tool into the at least one inner race of the dual angular contact bearing such that each of the O-rings mates with the inwardly facing surface of the at least one inner race and forms a pair of grease seals therewith; connecting a grease dispenser to the grease fitting; conveying grease from the grease dispenser along a supply passage from the grease fitting to the at least one grease outlet located in the exterior cylindrical surface of the grease tool between the pair of O-rings; and directing the supplied grease, at least partially via the pair of grease seals, through a gap in the dual angular contact bearing to facilitate repacking of the bearing chamber with grease.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. The invention will now be described, by way of example, with reference to the accompanying drawings in which.

Figure 1:
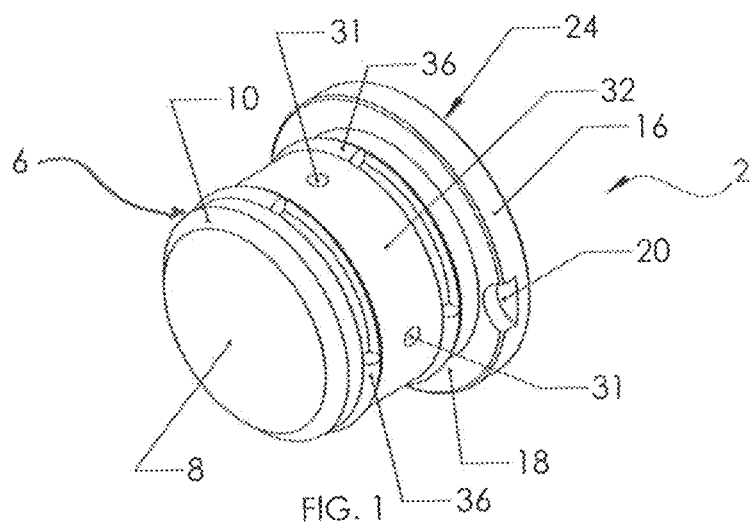
FIG. 1 is a leading front, top, right side perspective view of the bearing grease tool according to the invention.

It should be understood that the drawings are not necessarily to scale and that the disclosed embodiments are sometimes illustrated diagrammatical and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE PREFERRED EMBODIMENTS

The present invention will be understood by reference to the following detailed description, which should be read in conjunction with the appended drawings. It is to be appreciated that the following detailed description of various embodiments is by way of example only and is not meant to limit, in any way, the scope of the present invention.

Turning now to FIGS. 1-4, a brief description concerning the various components of the grease tool 2, according to the present invention, will now be briefly discussed. Thereafter, use of the grease tool 2 to grease a conventional wheel bearing, such as a dual angular contact bearing 4, will then be described. In the following description, the term dual angular contact bearing 4 will be utilized while it is to be appreciated that the present invention is applicable to a variety of different wheel bearings, including dual angular contact bearings.

As shown in FIGS. 1-4, the grease tool 2 generally comprises an elongate solid cylindrical hub 6. The cylindrical hub 6 is typically manufactured from a solid piece of a ferrous or a non-ferrous material, e.g., aluminum, plastic, steel, brass, etc., as an integral unitary component for delivery of grease to dual angular contact bearing 4 (see FIG. 4). It is to be appreciated that the overall size, e.g., diameter, of the cylindrical hub 6 of as well as its overall axial length will depend upon the size of the inner race 12 of the dual angular contact bearing 4 to be greased by the grease tool 2 (see FIG. 4). Normally the cylindrical hub 6 of the grease tool 2 has a diameter which is slightly smaller in size than the inner diameter of the two inner races 12 of the dual angular contact bearing 4 to be greased. The cylindrical hub 6 has a diameter of between 0.75 inches and 2.50 inches, typically about 1.5 inches, and has an axial length of between 0.75 and 4.0 inches, typically about 1.75 inches. It is to be appreciated, however, that the overall size and axial length of the elongate cylindrical hub 6 can vary, from application to application, without departing from the spirit and scope of the invention.

Figure 4:
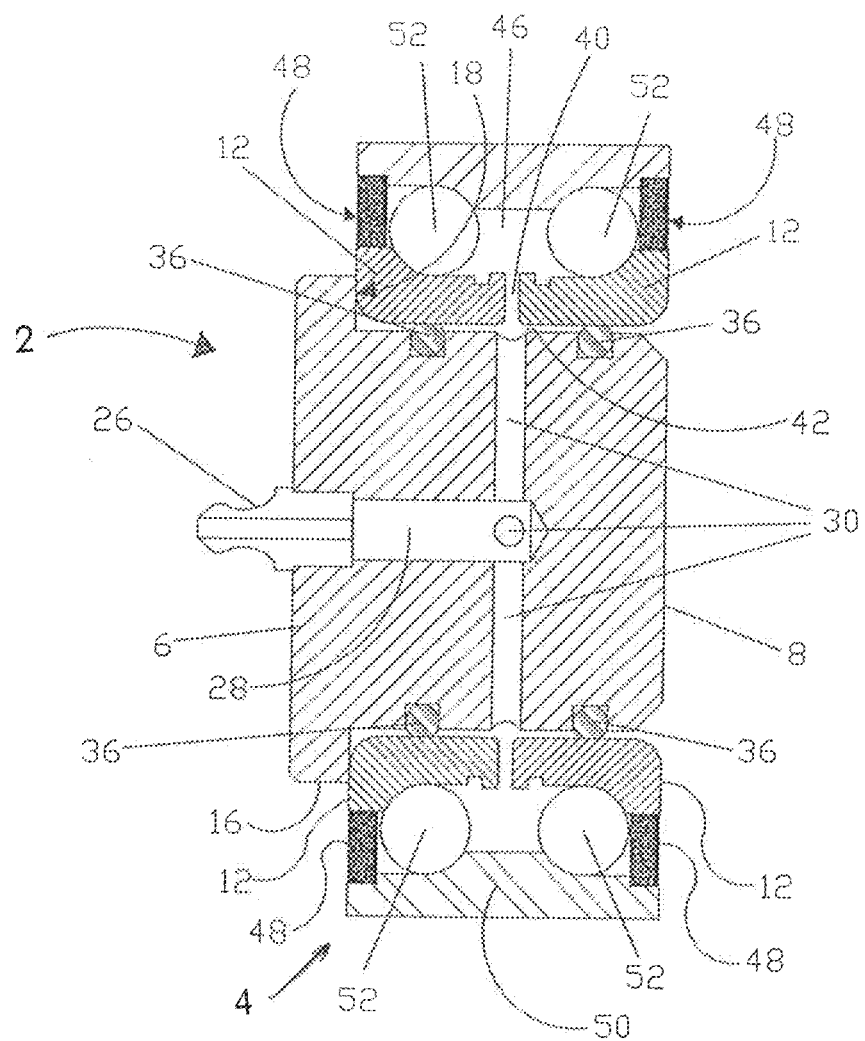
FIG. 4 is a cross section view showing the properly positioned grease tool within the inner race of a dual angular contact bearing to facilitate greasing of the dual angular contact bearing.

As generally shown in FIG. 4, a leading front end 8 of the grease tool 2 is typically provided with an annular beveled or chamfered surface 10 which facilitates centering and insertion of the leading front end 8 of the elongate cylindrical hub 6 into the inner race 12 of the dual angular contact bearing 4 to be greased. A trailing rear end 24 of the grease tool 2 includes a larger diameter flange 16 which has a leading surface 18 which functions as a stop or shoulder for precisely locating the grease tool 2 relative to the desired dual angular contact bearing 4 to be greased, as discussed below, and thereby prevent over-insertion of the elongate cylindrical hub 6 into the desired dual angular contact bearing 4 to be greased. As shown, the diameter of the flange 16 is somewhat larger than the inner diameter of the inner race 12. Normally the flange 16 of the grease tool 2 has a diameter of between 1.0 and 3.0 inches, typically about 2.0 inches, and an axial (e.g., thickness) length of between 0.25 and 1.5 inches, typically about 0.75 inches. It is to be appreciated, however, that the overall size, length and thickness of the flange 16 can vary, from application to application, without departing from the spirit and scope of the invention.

Figure 2:
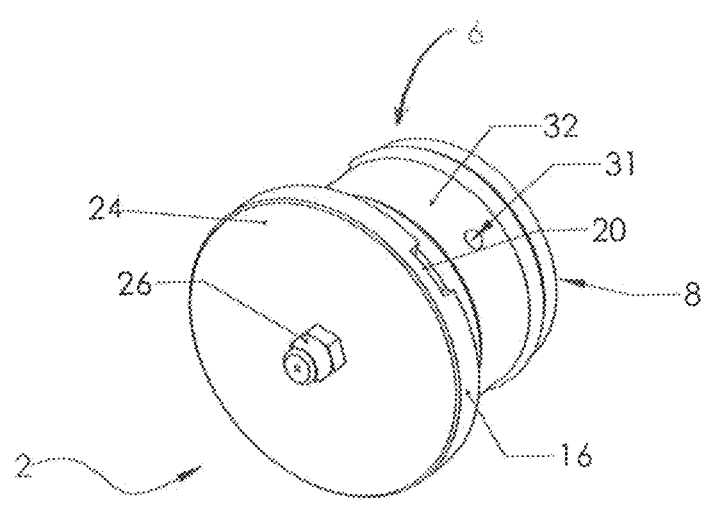
FIG. 2 is a trailing rear, top, left side perspective view of the bearing grease tool of FIG. 1.

The leading surface 18 of the flange 16 is typically provided with at least one, more preferably two or more opposed pry cavities 20 (see FIGS. 1 and 2). Each one of the pry cavities 20, following installation of the grease tool 2, is generally located adjacent a lateral side surface 22 of one of the inner races 12 of the dual angular contact bearing 4 being greased. In the event that the operator experiences any significant difficulty in removing the grease tool 2 from the inner race 12 of the dual angular contact bearing 4 being greased, following the application of the grease, the operator can insert, for example, the head of a flat head screw driver (not shown) into one of the pry cavities 20 and turn or rotate the flat head of the screw driver relative to the grease tool 2 to pry the grease tool 2 out of engagement with the inner race 12 of the dual angular contact bearing 4 being greased.

Figure 3:
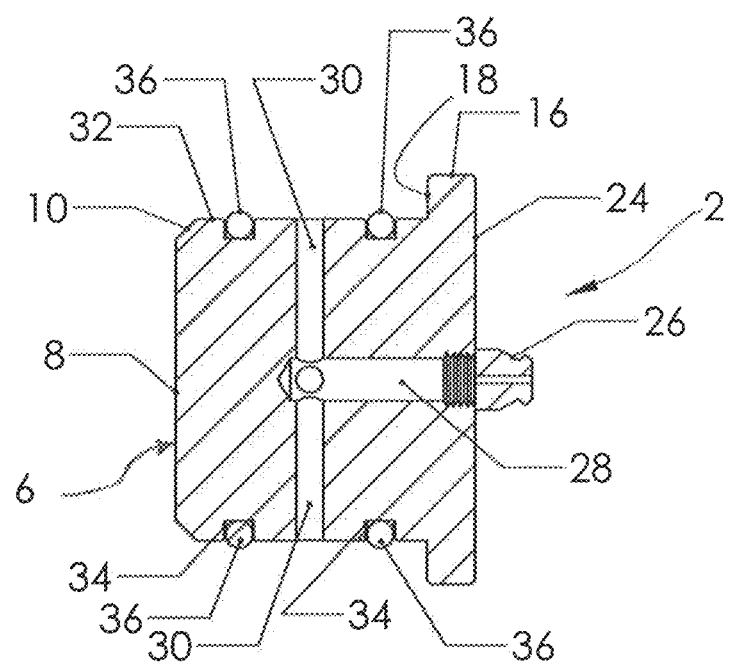
FIG. 3 is a cross sectional view along section line 3-3 of the bearing grease tool of FIG. 1.

The trailing surface 24 of the grease tool 2 is generally a flat surface and supports a grease nipple or fitting 26, e.g., a zerk fitting, which facilitates coupling or connection of a conventional grease dispenser (not shown), e.g., a grease gun, to the grease tool 2 in a conventional manner. As shown in FIG. 3, a centrally located supply port, passage or manifold 28 is formed in the trailing surface 24 of the grease tool 2 and an inlet end of the supply port, passage or manifold 28 is threaded for at least a short distance. A mating threaded end of the grease nipple or fitting 26 is threaded into the threaded inlet end of the supply port, passage or manifold 28 to connect the grease nipple or fitting 26 to the grease tool 2 and facilitate fluid communication between the conventional grease dispenser and the supply port, passage or manifold 28. Such threaded connection, between the grease nipple or fitting 26 and the threaded inlet end of the central supply port, passage or manifold 28, facilitates removal of the grease nipple or fitting 26 from the grease tool 2 for periodic cleaning or removal of the grease nipple or fitting 26 in the event that the grease nipple or fitting 26 becomes damaged, malfunctions or otherwise requires replacement.

As shown, the supply port, passage or manifold 28 extends completely through the flange 16 and generally at least partially, but not all the way, through the cylindrical hub 6. It is to be appreciated that desired marking indicia, such as the part number, the size of the grease tool 2, etc., can be (laser) marked on the trailing surface 24 of the grease tool 2, or on any other surface of the grease tool 2, to readily identify the grease tool 2 and facilitate using the correct grease tool 2 with the correct dual angular contact bearing 4.

A remote end of the central supply port, passage or manifold 28 communicates with at least one, typically between two to eight or more, radially extending supply ports, passages or manifolds 30 for distributing and supplying the supplied grease radially outward toward an exterior cylindrical surface 32 of the grease tool 2. When the supplied grease reaches the exterior cylindrical surface 32 of the grease tool 2, the supplied grease is typically uniformly circumferentially distributed around the periphery of the exterior cylindrical surface 32 of the grease tool 2 prior to being flowing radially into the dual angular contact bearing 4, as will be discussed below in further detail. The supply port, passage or manifold 28 and each of the radially extending supply port(s), passage(s) or manifold(s) 30 generally have a diameter of between 0.05 and 0.5 inches, typically about 0.15 inches. If desired, the size of the supply port, passage or manifold 28 can be enlarged.

As shown more clearly in FIG. 3, a pair of spaced apart annular channels 34 are formed in the exterior cylindrical surface 32 of the cylindrical hub 6. Each one of these annular channels 34 is typically axially spaced from an outlet end 31, each one of the radially extending supply port(s), passage(s) or manifold(s) 30, by a distance of between 0.5 and 1.5 inches, for example, typically about 0.75 inches. As shown in FIGS. 1-3, a conventional O-ring 36 is accommodated within each one of the annular channels 34 and the O-rings 36 assist with retaining the supplied grease therebetween and channeling of the supplied grease radially into an annular gap 40 typically formed in the inner race 12 of the dual angular contact bearing 4. The annular channels 34 each have a width of between 0.01 and 0.40 inches, typically about 0.2 inches and a depth of between 0.05 and 0.300 inches, typically about 0.13 inches. Each one of the O-rings 36 is preferably manufactured from a rubber material, such as buna-n, and has an outer diameter of between 0.80 and 2.75 inches, typically about 1.60 inches.

As generally shown in FIG. 4, the outer diameter of the cylindrical hub 6 is slightly smaller, e.g., between about 0.005 to about 0.250 of an inch, than the inner diameter of the pair of inner races 12 of the dual angular contact bearing 4 to be filled with grease so that the cylindrical hub 6 can be readily and easily be inserted into the inner races 12 while the O-rings 36 still form a sufficient grease seal with the inner races 12. The overall dimensions of the pair of annual channels 34 and the diameter of the pair of O-rings 36 are selected such that the outwardly facing exterior surface of the pair of O-rings 36 will each be compressed and have a slight interference fit, e.g., about 0.001 to about 0.020 of an inch, with the inwardly facing surface of the pair of inner races 12 of the dual angular contact bearing 4 to be filled with grease. As a result of this arrangement, each one of the O-rings 36 forms a fluid tight seal with a respective one of the inwardly facing surfaces of the inner races 12 of the dual angular contact bearing 4 so as to prevent, or minimize at the very least, any grease from flowing past either one of those O-ring seals and thereby assist with redirecting and channeling the supplied grease radially through the annular gap 40, formed between the pair of the inner races 12, and into the bearing chamber 46 of the dual angular contact bearing 4 to be greased for displacing of any air pockets, voids, liquid, water, dirt, debris, etc., contained therein, as will be described in further detail hereinafter.

Now with reference to FIG. 4, use of the grease tool 2 to grease a desired dual angular contact bearing 4 will now be described. In order to gain access to the dual angular contact bearing 4 to be greased, such as a dual angular contact bearing for an all terrain vehicle (ATV), the section of the vehicle containing the dual angular contact bearing 4 to be greased is typically raised off the ground, or some other supporting surface, by a conventional jack or lift to facilitate servicing of the vehicle. Thereafter, the wheel (not shown) is removed and, if necessary, the brake caliper (not shown) is also removed in order to provide access to a wheel hub (not shown). As is conventional in the art, the wheel hub rotates within the inner races 12 of the dual angular contact bearing 4 to be greased. In order to provide access, the wheel hub (not shown) is then removed, in a conventional manner, thereby exposing and providing direct access to at least the inner races 12 of the dual angular contact bearing 4 to be greased. Once access to the inner races 12 is established, the operator can then clear away any "old" grease, loose dirt, debris, etc., located on or around the inner races 12 and thereby facilitate unhindered insertion of the grease tool 2.

After initially clearly away any old grease, loose dirt, debris, etc., from the inner race 12, the operator then inserts the leading end 8 of the grease tool 2 into the inner races 12 of the dual angular contact bearing 4 until the leading surface 18 of the flange 16 of the grease tool 2 eventually abuts against the inner race 12 of the dual angular contact bearing 4, as generally shown in FIG. 4. Once the grease tool 2 is located in this position, the pair of O-rings 36 are both properly located on either side of the gap 40, formed between the pair of inner races 12 of the dual angular contact bearing 4. The pair of O-rings 36 are correctly positioned to form a pair of spaced apart annular seals which assist with redirecting the supplied grease radially toward and through the gap 40 formed between the inner races 12 of the dual angular contact bearing 4. It is to be appreciated that the gap 40 must be located within the "working range" of the grease tool 2, i.e., anywhere between pair of annular channels 34 and the O-rings 36, in order to facilitate the supply of grease thereto during servicing of the dual angular contact bearing 4.

Once the grease tool 2 is properly installed within the pair of inner races 12 of the dual angular contact bearing 4, as generally shown in FIG. 4, a conventional grease dispenser (not shown) is then connected to the grease nipple or fitting 26, in a conventional manner, in order to supply grease thereto. As the grease is supplied by the grease dispenser, the grease flows through the grease nipple or fitting 26, axially along the supply port, passage or manifold 28 and then radially along each of the at least one or more radially extending supply ports, passages or manifolds 30 through the one or more outlets 31 of the grease tool 2 for distribution to the dual angular contact bearing 4.

Once the supplied grease reaches the exterior cylindrical surface 32 of the grease tool 2, the supplied grease typically first completely fills the space 42 located between the exterior cylindrical surface 32 of the grease tool 2, the opposed pair of O-rings 36 and the inwardly facing surface of the pair of inner races 12. Generally after this space 42 is completely filled with and slightly pressurized by the supplied grease, then the supplied grease flows radially again through the conventional annular gap 40 formed between the pair of inner races 12 of the dual angular contact bearing 4. The O-rings 36 assist with channeling and redirecting the supplied grease radially through the gap 40, provided between the pair of inner races 12 of the dual angular contact bearing 4, into a bearing chamber 46 of the dual angular contact bearing 4. As generally shown, a plurality of ball bearings 52 are accommodated within the bearing chamber 46 between the inner and the outer races 12, 50 of the dual angular contact bearing 4.

The supplied grease applies pressure to the gap 40 which tends to cause the inner races 12 to be biased away from one another and thereby increase the axial length of the gap 40 formed between the inner races 12. As the supplied grease flows into the bearing chamber 46 of the dual angular contact bearing 4, the supplied grease tends to displace any "old grease" accommodated therein as well as any air pocket(s), water, fluid, dirt, debris, etc., contained within the bearing chamber 46 and forces the same axially past the bearings 52 and out through either one of the opposed lateral openings 48 formed between the inner races 12 and an outer race 50 of the dual angular contact bearing 4 thereby "repacking" the dual angular contact bearing 4 with fresh grease.

The operator typically continues dispensing grease from the grease dispenser to the dual angular contact bearing 4 until the operator finally detects some of the newly supplied grease leaking or oozing from each of the opposed lateral openings 48 formed between the pair of inner races 12 and the outer race 50 of the dual angular contact bearing 4. Once a sufficient amount of the newly supplied grease is detected as leaking or oozing from both the opposed lateral openings 48, the operator then determines that the dual angular contact bearing 4 is sufficiently filled and repacked with fresh grease and, thereafter, discontinues the supply of additional grease to the dual angular contact bearing 4 being greased.

Next, the operator typically wipes away and removes any excess grease which leaked or oozed from the opposed lateral openings 48. Thereafter, the operator then removes the grease tool 2 from the pair of inner races 12 of the dual angular contact bearing 4. Next, the wheel hub is then reassembled with the inner races 12 of the dual angular contact bearing 4, the brake caliper (if disassembled) is reassembled with the wheel axle and finally, the wheel is reinstalled on the wheel hub and the vehicle is lowered onto the ground for use.

Figure 5:
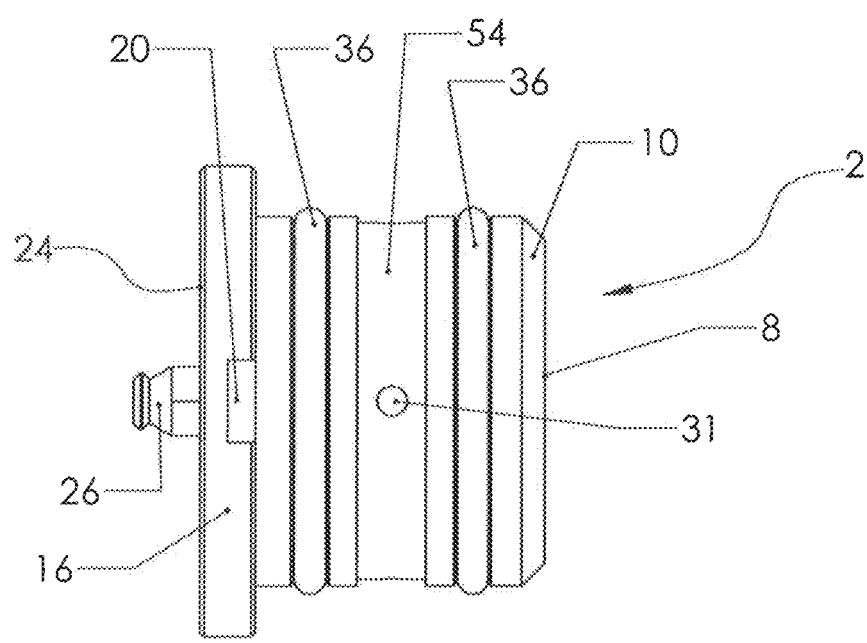
FIG. 5 is a left side elevational view of a second embodiment of the bearing grease tool according to the invention.
Figure 7:
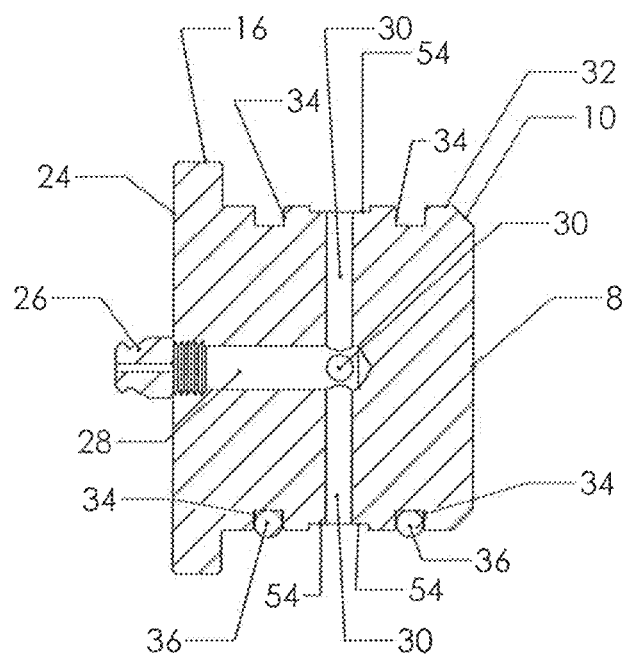
FIG. 7 is a cross sectional view of the bearing grease tool of FIG. 5.
Figure 6:
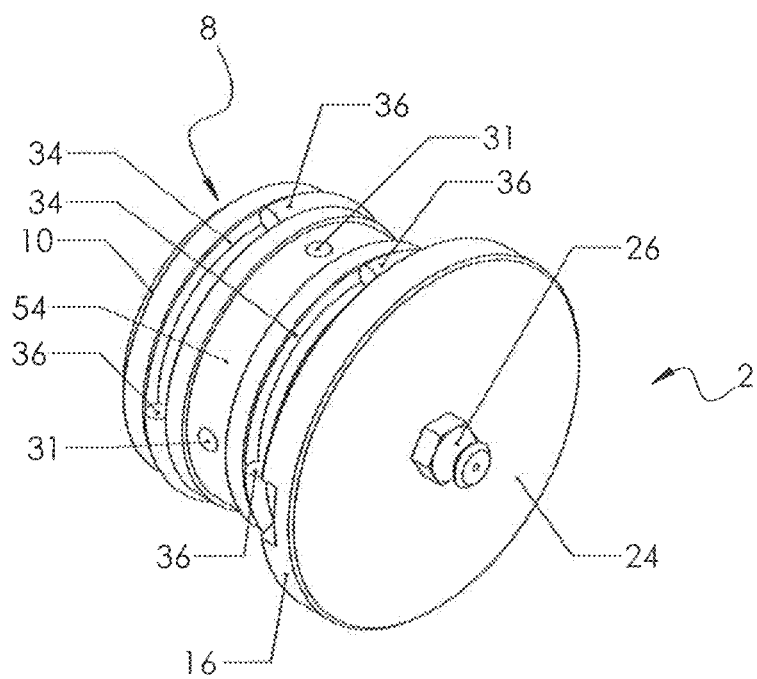
FIG. 6 is a trailing rear, top, right side perspective view of the bearing grease tool of FIG. 5.
Figure 8:
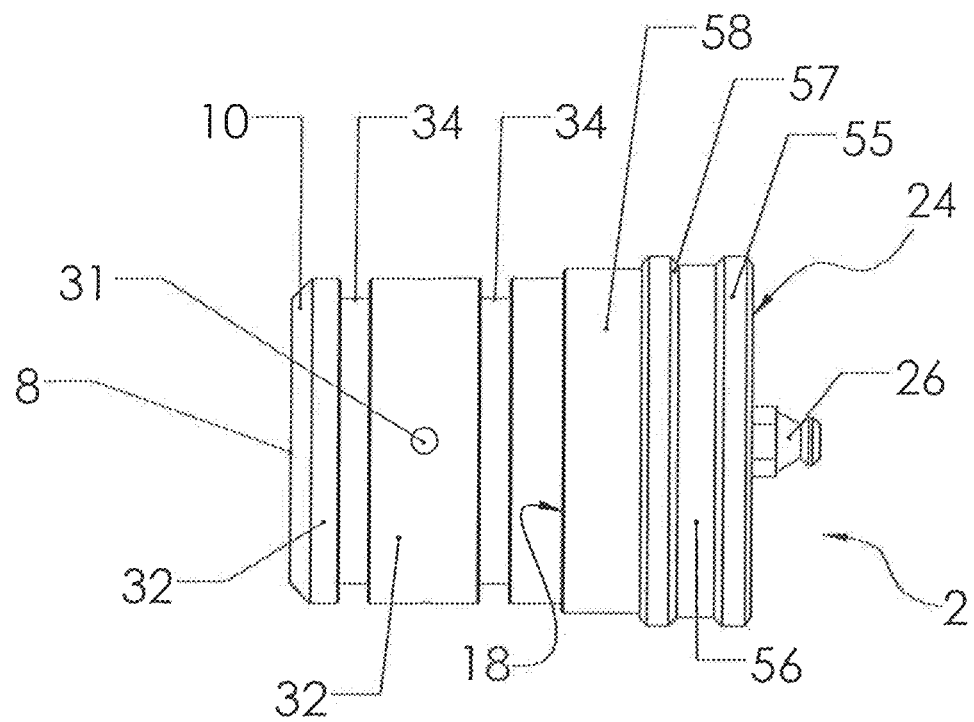
FIG. 8 is a right side elevational view of a third embodiment of the bearing grease tool according to the invention.
Figure 9:
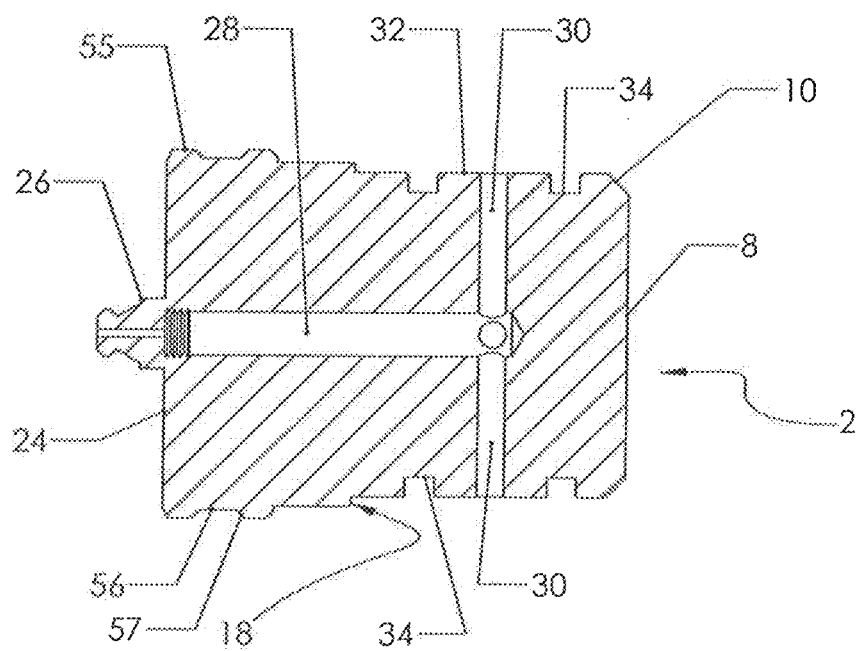
FIG. 9 is a cross sectional view of the bearing grease tool of FIG. 8.
Figure 10:
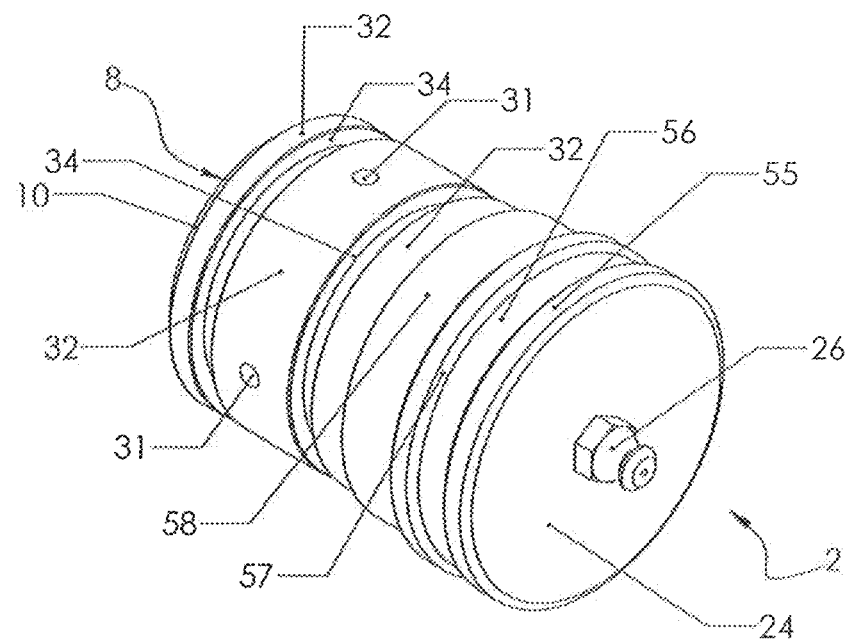
FIG. 10 is a trailing rear, top, right side perspective view of the bearing grease tool of FIG. 8.
Figure 11:
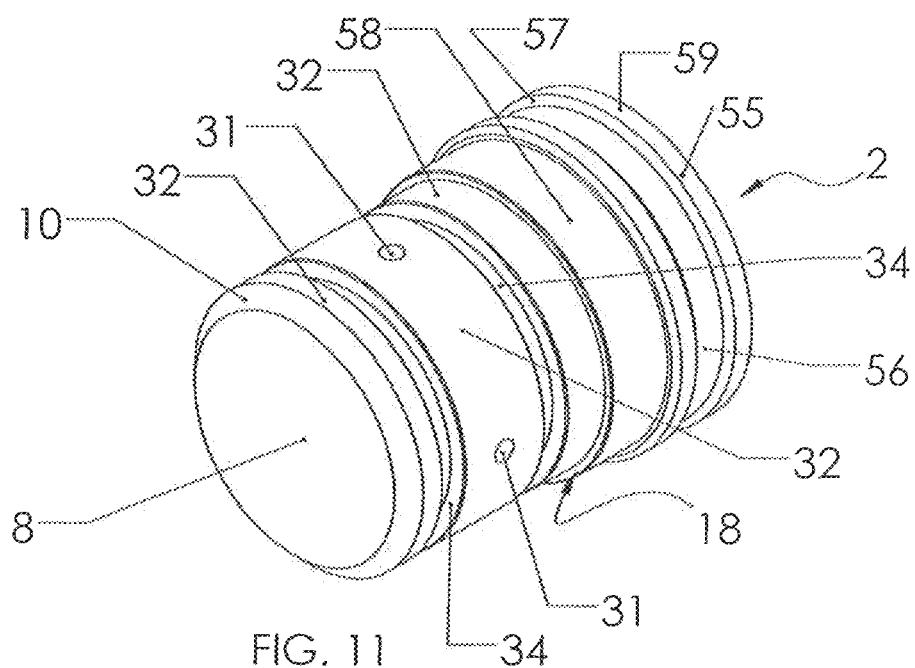
FIG. 11 is a leading front, top, right side perspective view of the bearing grease tool of FIG. 8.
Figure 12:
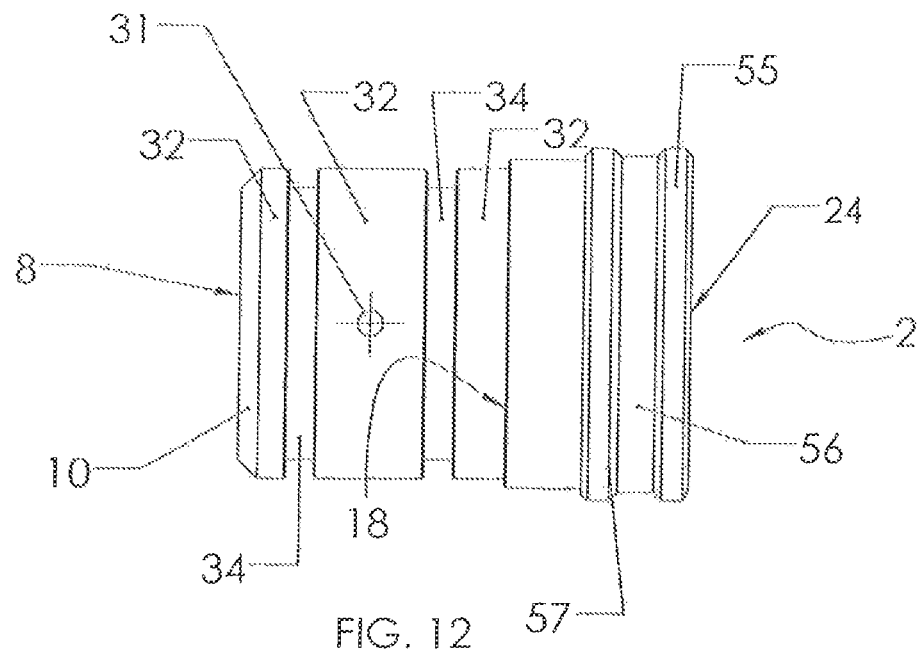
FIG. 12 is a right side elevational view of a fourth embodiment of the bearing grease tool according to the invention.
Figure 13:
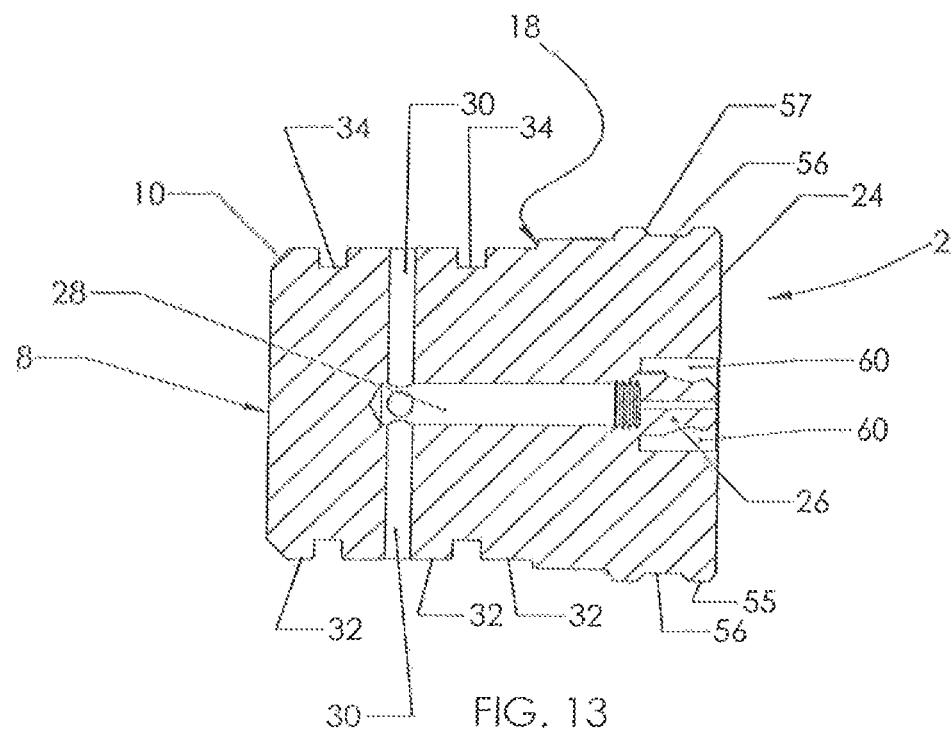
FIG. 13 is a cross sectional view of the bearing grease tool of FIG. 12.
Figure 14:
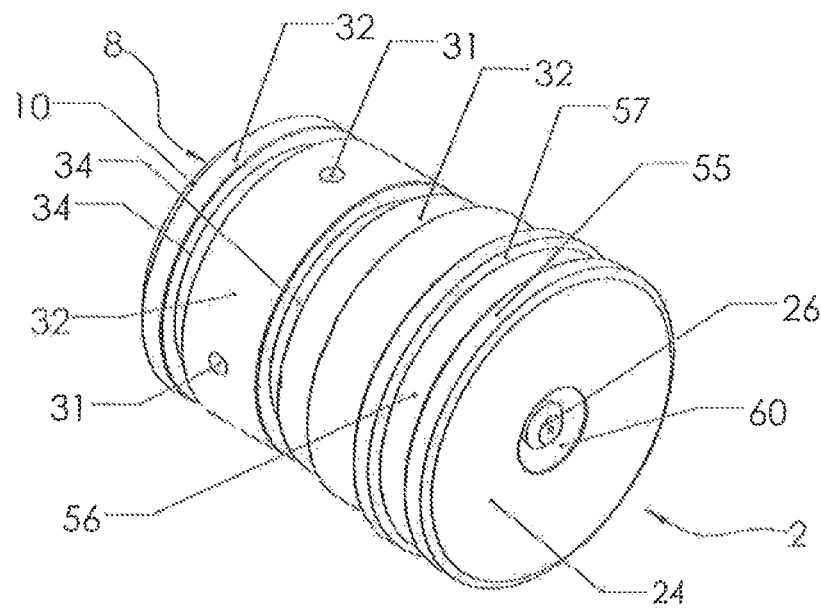
FIG. 14 is a trailing rear, top, right side perspective view of the bearing grease tool of FIG. 12.
Figure 15:
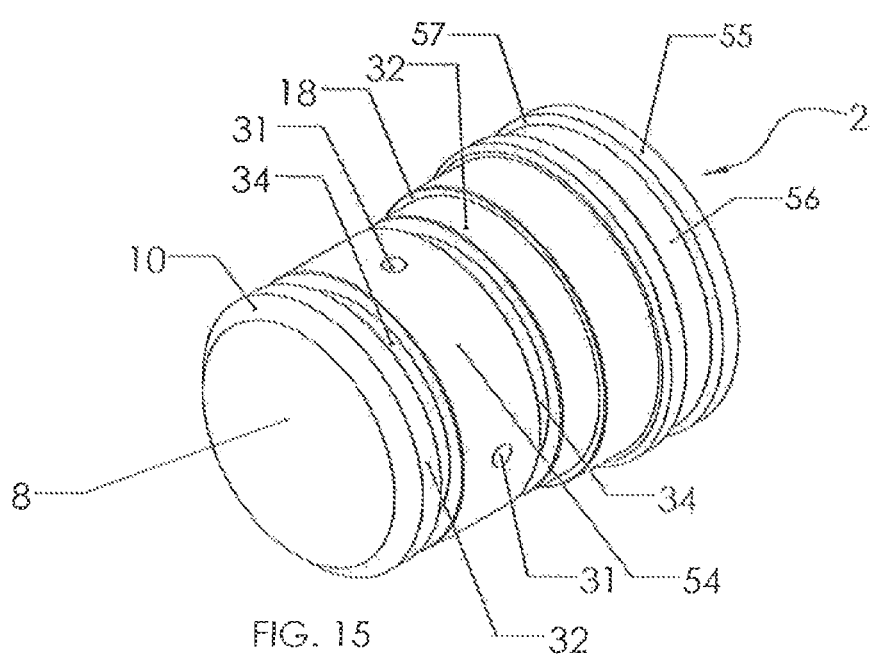
FIG. 15 is a leading front, top, right side perspective view of the bearing grease tool of FIG. 12.

Turning now to FIGS. 5-7, a second embodiment of the present invention will now be described. As this embodiment is very similar to the previously discussed embodiment, only the differences between this second embodiment and the previous embodiment will be discussed in detail while similar/identical elements will be given identical reference numerals.

The major difference between the second embodiment, and the previous embodiment, is that the exterior surface 32 of the grease tool 2 is provided with a recessed annular exterior surface 54. That is, the recessed annular exterior surface 54 has a somewhat smaller diameter than a remainder of the exterior surface 32 of the cylindrical hub 6, e.g., a diameter which is between about 0.001 to 0.500 inches smaller than the diameter of the exterior surface 32. The recessed annular exterior surface 54 has a width, e.g., an axial length, of between about 0.01 to 1.4 inches. The recessed annular exterior surface 54 further assists with distribution of the supplied grease around and along the entire periphery and circumference of the grease tool 2 which ensures that the supplied grease is eventually conveyed radially into the dual angular contact bearing 4 around its entire periphery as well to completely fill the bearing chamber 46 of the dual angular contact bearing 4. As a result, the overall size of the space 42, located between the pair of O-rings 36, the inwardly facing surface of the inner race 12 and the annular exterior surface recess 54 of the grease tool 2, is somewhat larger than the previous embodiment.

Turning now to FIGS. 8-11, a third embodiment of the present invention will now be described. As this embodiment is very similar to both of the previously discussed embodiments, only the differences between the third embodiment and both of the previous embodiments will be discussed in detail while similar/identical elements will be given identical reference numerals.

The primary difference, between this embodiment and the previous two embodiments, is that the flange 16 of the grease tool 2 is located between an enlarged head 56 and the cylindrical hub 6. According to this embodiment, the enlarged head 56 is formed integral with the flange 16. The enlarged head 56 has a diameter which is slightly larger in size or diameter than the diameter of both the flange 16 and the exterior surface 32 of the cylindrical hub 6. In addition, a pair of spaced apart ribs 55, 57 are integrally formed in an outer circumferential surface of the enlarged head 56. Each one of these spaced apart ribs 55, 57 forms a gripping feature or member for a user to assist with gripping and removal of the grease tool 2 from the dual angular contact bearing 4, following use thereof.

According to this embodiment, the leading surface 18 of the flange 16 still abuts against the inner race 12 but the flange 16 is designed to facilitate spacing the enlarged head 56 away from the cylindrical hub 6 so that the pair of spaced apart ribs 55, 57 can be easily gripped. In addition, the flange 16 has a large enough diameter to still function as a stop but the flange 16 is small enough to provide a relief or undercut area to compensate for any external seal(s) of the dual angular contact bearing 4 that may present.

As with the previous embodiments, once the grease tool 2 is fully inserted into the dual angular contact bearing 4 (as shown in FIG. 4), the leading surface 18 of the flange 16 abuts the inner race 12 which facilitates precise radial alignment between the at least one or more radially extending supply ports, passages or manifolds 30 and the gap 40. Once this occurs, the pair of spaced apart ribs 55, 57 of the enlarged head 56 remain sufficiently spaced from the inner race 12 and thus are easily grippable to facilitate gripping and removal of the grease tool 2 following use thereof. That is, the operator of the grease tool 2 can readily place his/her fingers around at least one of the pair of spaced apart ribs 55, 57, which are sufficiently spaced from the inner races 12, and this assists with secure gripping and easy removal of the grease tool 2 from the dual angular contact bearing 4.

The flange 16 of the grease tool 2, according to this embodiment, has a diameter of between 0.80 and 3.0 inches, typically about 2.0 inches, and an axial (e.g., thickness) length of between 0.25 and 1.5 inches, typically about 0.75 inches. The enlarged head 56 of the grease tool 2, according to this embodiment, has a diameter of between 1.25 and 4.0 inches, typically about 2.25 inches, and an axial (e.g., thickness) length of between 0.25 and 1.5 inches, typically about 0.75 inches. It is to be appreciated, however, that the overall size, length and thickness of both the flange 16 and the enlarged head 56 can vary, from application to application, without departing from the spirit and scope of the invention.

Turning now to FIGS. 12-15, a fourth embodiment of the present invention will now be described. As this fourth embodiment is very similar to the third embodiment, only the differences between the fourth embodiment and the previously discussed third embodiment will be discussed in detail while identical elements will be given identical reference numerals.

The primary difference between the fourth embodiment and the third embodiment is that the trailing surface 24 of the grease tool 2 is provided with a counter bore 60 which is both sufficiently large as well as being sufficiently deep so as to completely accommodate and recess the grease nipple or fitting 26 within the trailing surface 24 of the grease tool 2. By accommodating the grease nipple or fitting 26 within the counter bore 60, the grease nipple or fitting 26 is generally completely recessed within the grease tool 2 and thus sheltered and protected from damage in the event that the grease tool 2 is inadvertently dropped or hit. However, the counter bore 60 is still must be sufficiently large enough in diameter so as permit a conventional grease dispense tip (not shown) to be received within counter bore 60 and matingly engage with the grease nipple or fitting 26, in a conventional manner, to facilitate dispensing of grease to the grease tool 2.

As with the previous embodiments, the centrally located supply port, passage or manifold 28 is threaded (not separately labeled) for a short distance, e.g., ⅛ to ½ or so. The mating threaded end of the grease nipple or fitting 26 is threaded into the threaded inlet end of the supply port, passage or manifold 28 to connect the grease nipple or fitting 26 to the grease tool 2 and facilitate fluid communication between the conventional grease dispenser and the supply port, passage or manifold 28. Such threaded connection facilitates removal of the grease nipple or fitting 26 for periodic cleaning, or removal of the grease nipple or fitting 26 in the event that the grease nipple or fitting 26 becomes damaged, malfunctions or otherwise requires replacement.

Although the above description and the accompanying drawings show and disclose various embodiments of the present invention, it is to be appreciated that one or more elements or features from one embodiment can be incorporated into another embodiment without departing from the spirit and scope of the invention. That is, while various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure is presented for the purposes of illustration and description. It is not intended to be exhaustive or to limit the present disclosure to the precise form disclosed. Many modifications and variations are possible in light of this disclosure without departing from the spirit and scope of the disclosure. Although operations may be described in a particular order, this should not be understood as requiring that such operations be performed in the disclosed particular order shown or in a sequential order, or that all illustrated operations be performed in order to achieve desirable results.

Wherefore, I claim:

1. A grease tool for mating with a pair of inner races of a dual angular contact bearing to facilitate greasing of the dual angular contact bearing, and the grease tool comprising:

a cylindrical hub having an exterior cylindrical surface;

a flange being supported adjacent one end of the cylindrical hub for limiting insertion of the grease tool into the pair of inner races of the dual angular contact bearing;

both the cylindrical hub and the flange being fabricated from a single unitary piece of material which extends from a leading end of the grease tool to a trailing end of the grease tool;

inwardly facing surfaces of both the flange and the cylindrical hub together define a grease supply passage extending along a portion of the grease tool;

a grease fitting being coupled to an inlet of the grease supply passage for conveying supplied grease to and along the grease supply passage to at least one grease outlet formed in the exterior cylindrical surface of the cylindrical hub;

a pair of spaced apart O-rings being accommodated by an exterior surface of the cylindrical hub and the at least one grease outlet being located in the exterior surface of the cylindrical hub between the pair of O-rings; and the pair of spaced apart O-rings facilitate forming a pair of spaced apart grease seals, when the cylindrical hub of the grease tool engages with an inwardly facing surface of the pair of inner races of the dual angular contact bearing, and directing the supplied grease radially through an annular gap, formed between the pair of inner races, into a bearing chamber of the dual angular contact bearing to facilitate repacking the bearing chamber with grease.

2. The grease tool according to claim 1, wherein the grease fitting is releasably connected to the trailing end of the grease tool, and the grease fitting facilitates connection of a grease dispenser to the grease supply passage for supplying grease thereto.

3. The grease tool according to claim 1, wherein the inlet of the grease supply passage is threaded, and a mating threaded end of the grease fitting threadedly engages with the threaded inlet of the grease supply passage to provide releasable attachment of the grease fitting to the grease tool.

4. The grease tool according to claim 1 in combination with the dual angular contact bearing, wherein a remote end of the grease supply passage communicates with at least one radially extending supply passage for supplying the grease radially outward to the at least one grease outlet formed in exterior cylindrical surface of the grease tool located between the pair of spaced apart O-rings.

5. The grease tool according to claim 1, wherein a pair of spaced apart annular channels are formed in the exterior cylindrical surface of the cylindrical hub, and each one of the pair of annular channels accommodates a respective one of the pair of spaced apart O-rings.

6. The grease tool according to claim 5, wherein each one of the pair of annular channels has a width of between 0.01 and 0.40 inches and a depth of between 0.05 and 0.300 inches; and a diameter of the pair of spaced apart O-rings is slightly larger than a diameter of inner races of the dual angular contact bearing to be greased, but smaller than a diameter of the outer races, so as to form a fluid tight seal with the inner races, when the pair of spaced apart O-rings respectively engage with the pair of inner races of the dual angular contact bearing, to facilitate repacking of the bearing chamber of the dual angular contact bearing with grease.

7. The grease tool according to claim 5, wherein each of the pair of spaced apart O-rings is manufactured from a rubber material and has an outer diameter of between 0.75 and 2.75 inches.

8. The grease tool according to claim 1, wherein a diameter of the cylindrical hub is slightly smaller than a diameter of the pair of inner races of the dual angular contact bearing to be greased so that the cylindrical hub can be inserted into the pair of inner races while each one of the pair of O-rings have an interference fit with the inwardly facing surface of a respective one of the pair of inner races of the dual angular contact bearing to be greased.

9. The grease tool according to claim 1, wherein each one of the O-rings forms a fluid tight seal with the inwardly facing surface of a respective one of the pair of inner races of the dual angular contact bearing so as to minimize a flow of grease past either grease seal and thereby assist with directing substantially all of the supplied grease radially through the annular gap, formed between the pair of inner races, and into the bearing chamber of the dual angular contact bearing for displacing of any air, liquid, water, dirt, and/or debris contained in the bearing chamber.

10. The grease tool according to claim 1, wherein the leading end of the cylindrical hub is provided with an annular chamfered surface which facilitates centering and insertion of the leading end of the cylindrical hub into the pair of inner races of the dual angular contact bearing to be greased.

11. The grease tool according to claim 1, wherein the cylindrical hub has a diameter of between 0.75 inches and 2.75 inches and has an axial length of between 015 and 4.0 inches.

12. The grease tool according to claim 1, wherein the flange has a diameter of between 1.0 and 3.0 inches, and an axial length of between 0.25 and 1.5 inches.

13. The grease tool according to claim 1, wherein the cylindrical hub and the flange are manufactured from a single solid piece of one of aluminum, plastic, steel or brass.

14. The grease tool according to claim 1, wherein the flange has at least one pry cavity formed in a surface of the flange which assist with removing the grease tool from the pair of inner races of the dual angular contact bearing to be greased, following filling of the dual angular contact bearing with grease.

15. The grease tool according to claim 1, wherein an exterior surface of the grease tool is provided with a recessed annular exterior surface which has a smaller diameter, than a remainder of the exterior surface of the cylindrical hub, and the recessed annular exterior surface assists with distribution of the supplied grease around an entire circumference of the grease tool.

16. The grease tool according to claim 1, wherein the flange comprises an enlarged head, a flange surface connects the flange to the cylindrical hub, the enlarged head has a diameter which is larger than a diameter of the cylindrical hub, but when the flange surface abuts against a first one of the pair of inner races, the enlarged head remains sufficiently spaced away from the first one of the pair of inner races and so as to from a gripping feature which facilitates gripping and removal of the grease tool from the dual angular contact bearing, following use thereof.

17. The grease tool according to claim 16, wherein the enlarged head further comprises at least one rib which is integrally formed in an outer circumferential surface of the enlarged head, and the at least one rib is designed to facilitate gripping and removal of the grease tool from the dual angular contact bearing to be greased, following use thereof; and a spacing of the pair of spaced apart O-rings from one another is less than a width of the dual angular contact bearing to be greased.

18. The grease tool according to claim 1, wherein the trading end of the grease tool is provided with a counter bore which accommodates the grease fitting such that the grease fitting is recessed within the counter bore and thereby protected from damage in the event that the grease tool is inadvertently hit or dropped.

19. A dual angular contact bearing grease tool for mating with a pair of inner races of a dual angular contact bearing to facilitate greasing of the dual angular contact bearing, and the grease tool comprising:

a cylindrical hub having an axial length which is greater than ½ of an axial length of the inner race of the dual angular contact bearing to be greased;

a flange being supported adjacent one end of the cylindrical hub for preventing further insertion of the grease tool into the pair of inner races of the dual angular contact bearing to be greased;

both the cylindrical hub and the flange being fabricated from a single unitary piece of material which extends from a front end to a trailing end of the grease tool;

inwardly facing surfaces of both the flange and the cylindrical hub together define a grease supply passage extending axially along a portion of the grease tool;

a spacing of the pair of spaced apart O-rings from one another is less than a width of the dual angular contact bearing to be greased;

a grease fitting being coupled to an inlet of the grease supply passage for conveying the supplied grease to and along the grease supply passage to at least one grease outlet formed in an exterior cylindrical surface of the cylindrical hub so that the supplied grease can be subsequent channeled through a gap, formed between the pair of inner races, and into a bearing chamber of the dual angular contact bearing to be greased to facilitate repacking of the bearing chamber with grease;

a pair of spaced apart O-rings being accommodated by the exterior surface of the cylindrical hub and the at least one grease outlet being located in the exterior surface of the cylindrical hub between the pair of O-rings; and the pair of spaced apart O-rings, when the grease tool engages with inwardly facing surfaces of the pair of inner races of the dual angular contact bearing to be greased, prevent a flow of grease axially past the O-rings and facilitate forming a pair of spaced apart grease seals, with the pair of inner races of the dual angular contact bearing, which facilitate directing of the supplied grease radially through a gap formed between the pair of inner races and into the bearing chamber of the dual angular contact bearing.

20. A method of greasing a bearing chamber of a dual angular contact bearing with a dual angular contact bearing grease tool, the method comprising:

providing the cylindrical hub with an exterior cylindrical surface;

supporting a flange adjacent one end of the cylindrical hub for preventing further insertion of the grease tool into a pair of inner races of the dual angular contact bearing;

fabricating both the cylindrical hub and the flange from a single unitary piece of material which extends from a leading end of the grease tool to a trailing end of the grease tool;

defining a grease supply passage, via inwardly facing surfaces of both the flange and the cylindrical hub, which initially extends axially, from the trailing end toward the leading end, along a portion of the grease tool and then radially to the exterior cylindrical surface of the cylindrical hub;

attaching a grease fitting to an inlet of the grease supply passage for conveying supplied grease to and along the grease supply passage to at least one grease outlet formed in the exterior cylindrical surface;

accommodating a pair of spaced apart O-rings on the exterior surface of the cylindrical hub, and locating the at least one grease outlet in the exterior surface of the cylindrical hub between the pair of O-rings;

inserting the grease tool into the pair of inner races of the dual angular contact bearing to be greased such that each of the O-rings mates with a respective inwardly facing surface of the pair of inner races to form a pair of grease seals;

connecting a grease dispenser to the grease fitting;

conveying grease from the grease dispenser along the grease supply passage from the grease fitting to the at least one grease outlet located in the exterior cylindrical surface of the grease tool between the pair of O-rings; and directing the supplied grease, at least partially via the pair of grease seals, through a gap, formed between the pair of inner races of the dual angular contact bearing, to facilitate repacking of the bearing chamber with grease.

21. A grease tool for mating with a pair of inner races of a dual angular contact bearing to facilitate greasing of the dual angular contact bearing, and the grease tool comprising:

a cylindrical hub having an exterior cylindrical surface;

a flange being supported adjacent a trailing end of the cylindrical hub for limiting insertion of the grease tool into the pair of inner races of the dual angular contact bearing;

both the cylindrical hub and the flange being fabricated from a single unitary piece of material which extends from a leading end of the grease tool to the trailing end of the grease tool;

a grease fitting being coupled to an inlet of a grease supply passage for conveying supplied grease to and along the grease supply passage to at least one grease outlet formed in the exterior cylindrical surface of the cylindrical hub;

a counter bore being formed in the flange, and the counter bore being sufficiently deep so as to recess the grease fitting within the counter bore and thereby protected the grease fitting from damage in an event that the grease tool is inadvertently hit or dropped;

a pair of spaced apart O-rings being accommodated by an exterior surface of the cylindrical hub and the at least one grease outlet being located in the exterior surface of the cylindrical hub between the pair of O-rings; and the pair of spaced apart O-rings facilitate formation of a pair of spaced apart grease seals, when the pair of spaced apart O-rings of the grease tool engage with a respective inwardly facing surface of the pair of inner races of the dual angular contact bearing, to direct supplied grease from the grease supply passage radially through an annular gap, formed between the pair of inner races, and into a bearing chamber of the dual angular contact bearing to facilitate repacking of the bearing chamber with grease.

22. A grease tool for mating in combination with a dual angular contact bearing, the dual angular contact bearing comprising:
- a pair of inner races with an annular gap formed therebetween; and
- a bearing chamber communicating with the annular gap of the dual angular contact bearing;

the grease tool comprising:
- a cylindrical hub having an exterior cylindrical surface;
- a flange being supported adjacent a trailing end of the grease tool for limiting insertion of the grease tool into the pair of inner races of the dual angular contact bearing;
- both the cylindrical hub and the flange being fabricated from a single unitary piece of material which extends from a leading end of the grease tool to the trailing end of the grease tool;
- a grease fitting being coupled to an inlet of the grease supply passage for conveying supplied grease to and along the grease supply passage to at least one grease outlet formed in the exterior cylindrical surface of the cylindrical hub; and
- a pair of spaced apart O-rings being accommodated by an exterior surface of the cylindrical hub and the at least one grease outlet being located in the exterior surface of the cylindrical hub between the pair of O-rings;

when the cylindrical hub of the grease tool is inserted in the pair of inner races, each one of the pair of spaced apart O-rings engages with an inwardly facing surface of a respective one of the pair of inner races so as to form therewith a pair of grease seals, and the pair of grease seals direct the supplied grease, when the grease is supplied along the grease supply passage, radially through the annular gap and into the bearing chamber of the dual angular contact bearing to facilitate repacking of the bearing chamber with grease.

* * * * *